United States Patent [19]

Albrecht et al.

[11] Patent Number: 4,644,817
[45] Date of Patent: Feb. 24, 1987

[54] STEERING WHEEL FOR A MOTOR VEHICLE

[75] Inventors: Wilhelm Albrecht, Vaihingen; Dieter Würz, Ditzingen; Karl Peitsmeier, Neuhausen; Heinz Waldschutz, Ostfildern; Walter Rückert, Esslingen; Klaus Kuhn; Helmut Patzelt, both of Fellbach, all of Fed. Rep. of Germany

[73] Assignee: Daimler-Benz Aktiengesellschaft, Fed. Rep. of Germany

[21] Appl. No.: 469,975

[22] Filed: Feb. 25, 1983

Related U.S. Application Data

[63] Continuation of Ser. No. 184,911, Sep. 8, 1980, abandoned.

[30] Foreign Application Priority Data

Sep. 6, 1979 [DE] Fed. Rep. of Germany ....... 2935936

[51] Int. Cl.[4] .......................... B62D 1/04; G05G 1/10
[52] U.S. Cl. .................................... 74/552; 29/159 B; 280/750
[58] Field of Search .......................... 74/552; 280/750; 29/159 B

[56] References Cited

U.S. PATENT DOCUMENTS

| | | | |
|---|---|---|---|
| 3,016,764 | 1/1962 | Fredericks et al. | 74/552 |
| 3,561,286 | 2/1971 | Edge et al. | 74/552 |
| 3,596,532 | 8/1971 | Wilfert | 74/552 |
| 3,614,901 | 10/1971 | Henning | 74/552 |
| 3,641,834 | 2/1972 | Barenyi | 74/552 |
| 3,675,505 | 7/1972 | Henning | 74/552 |

FOREIGN PATENT DOCUMENTS

| | | | |
|---|---|---|---|
| 1945480 | 4/1971 | Fed. Rep. of Germany | 280/750 |
| 2740987 | 3/1979 | Fed. Rep. of Germany | 74/552 |
| 2346195 | 10/1977 | France | 74/552 |
| 2353425 | 12/1977 | France | 280/750 |
| 1323209 | 7/1973 | United Kingdom | 74/552 |

Primary Examiner—Lawrence Staab
Attorney, Agent, or Firm—Barnes & Thornburg

[57] ABSTRACT

An automobile steering wheel that is disposed below a plane of a steering wheel rim. As a protection against impact, there is a plastically deformable cup-like deformation member within the steering wheel that absorbs energy due to an impact of a driver of the motor vehicle on the steering wheel. Spokes are constructed in such a manner that the contribute to the energy absorption by a performance of deformation work. The deformation member has a height which is less than a distance between the hub and the plane of the steering wheel rim. The deformation member is fixedly connected in its upper region with the respective spokes.

13 Claims, 3 Drawing Figures

STEERING WHEEL FOR A MOTOR VEHICLE

This is a continuation of application Ser. No. 184,911, filed Sept. 8, 1980, now abandoned.

The present invention relates to a steering wheel and, more particularly, to a steering wheel for passenger motor vehicles which includes a hub, sunken or disposed below a plane extending through a rim of the steering wheel, a plastically deformable cup-like deformation member within the steering wheel for absorbing impact energy resulting from a driver of the motor vehicle impacting on the steering wheel as a form of an impact protection device, and steering wheel spokes which are so constructed that, through deformation work, the spokes contribute to the overall energy absorption capabilities of the steering wheel.

A safety steering wheel of the aforementioned type is proposed in German Pat. No. 1,175,092 which wheel is designed in such a manner that it offers a large impact surface for enabling a impacting of a whole upper body of a driver of the motor vehicle in case of an accident especially when the driver was not employing a safety belt system. By virtue of the need to provide a large impact surface, all the parts involved such as, for example, the rim and spokes of the steering wheel as well as the deformation member had to be constructed so as to be correspondingly rigid. However, since it may now be assumed that today a large number of drivers of motor vehicles use a safety belt, the problems relating to safety steering wheels has changed to a certain extent. More particularly, if the motor vehicle is involved in an accident and the driver is utilizing a safety belt, a situation arises wherein the upper body of the driver is held back by the safety belt; however, under unfavorable conditions, the head of the driver of the motor vehicle may strike the steering wheel. In view of this potentially dangerous situation, the rim and spokes should be constructed so as to be more yielding than previously proposed without having the steering wheel loose its capacity for energy absorption or being constructed so yielding that in driving or operating the motor vehicle, the steering wheel might shimmy or the like.

The aim underlying the present invention essentially resides in providing a safety steering wheel for a motor vehicle which provides for a maximum impact protection for a driver of the motor vehicle without requiring a considerable expenditure for construction.

In accordance with advantageous features of the present invention, a safety steering wheel is provided which includes a deformation member having a height which is less than a distance between the hub and a plane of the steering wheel rim, with the deformation member being fixedly connected in an upper zone via a bridge and a bracket member with spokes of the steering wheel.

By virtue of a steering wheel construction such as proposed by the present invention, the deformation member is drawn onto the intrinsically yielding spokes in a simple and advantageous manner for reinforcement of the spokes without thereby making it necessary to provide any additional expenditures for construction of the steering wheel.

Advantageously, in accordance with the present invention, the spokes are made of a metallic material in such a manner, especially with respect to the shaping of the spokes, that in a lower region that is in a vicinity of the hub of the steering wheel, the spokes bend more readily than in an upper region in a vicinity of the steering wheel rim.

Advantageously, in accordance with further features of the present invention, the deformation member is open toward a top and is covered by a buffer plate, with the buffer plate preferably serving to actuate, for example, a horn of the vehicle.

Preferably, the deformation member is provided with at least one abrupt change in diameter so as to form a step.

Advantageously, in a zone or region of the deformation member above the step, a cylindrical region is provided and below the step, the deformation member exhibits a conical cross section.

In accordance with further features of the present invention, a bracket is disposed on the respective spokes with the deformation member being attached by, for example, bolting or the like through a bridge member to the spokes.

Advantageously, an upper side of the brackets that serve for a fastening of the deformation member is about half a height of the respective spokes.

Accordingly, it is an object of the present invention to provide a safety steering wheel for a motor vehicle which avoids, by simple means, shortcomings and disadvantages encountered in the prior art.

Another object of the present invention resides in providing a safety steering wheel for a motor vehicle which minimizes if not avoids injuries to a driver's head impacting upon the steering wheel during a collision of the motor vehicle.

Yet another object of the present invention resides in providing a safety steering wheel for motor vehicles which yields upon a predetermined impact but yet exhibits sufficient stability so as to prevent shimmying of the wheel during operation of the motor vehicle.

A still further object of the present invention resides in providing a steering wheel for a motor vehicle which is simple in construction and therefore relatively inexpensive to manufacture.

These and other objects, features, and advantages of the present invention will become more apparent from the following description when taken in connection with the accompanying drawings which show, for the purposes of illustration only, one embodiment in accordance with the present invention, and wherein.

Figure 1:
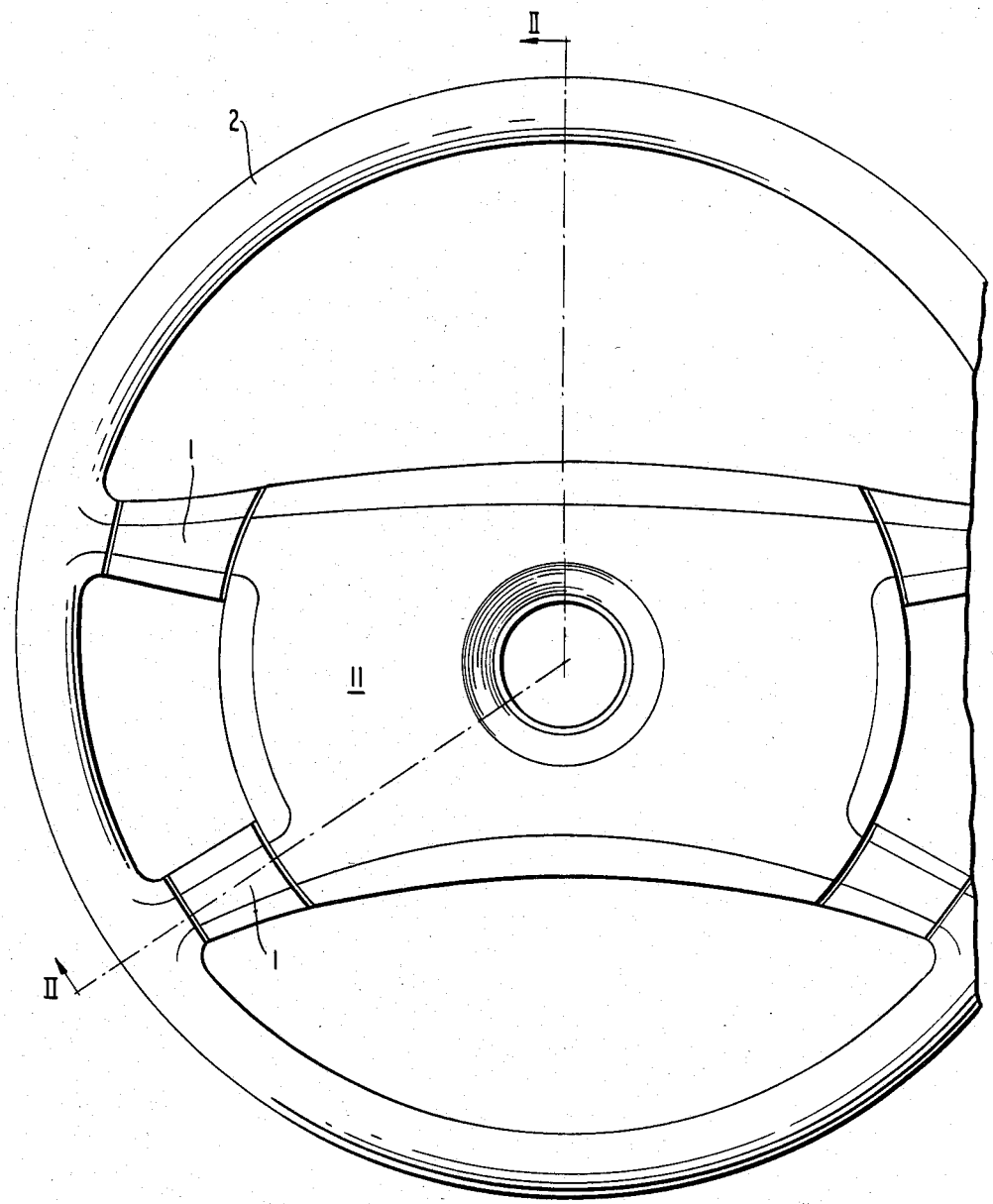
FIG. 1 is a partial top view of a safety steering wheel constructed in accordance with the present invention.
Figure 2:
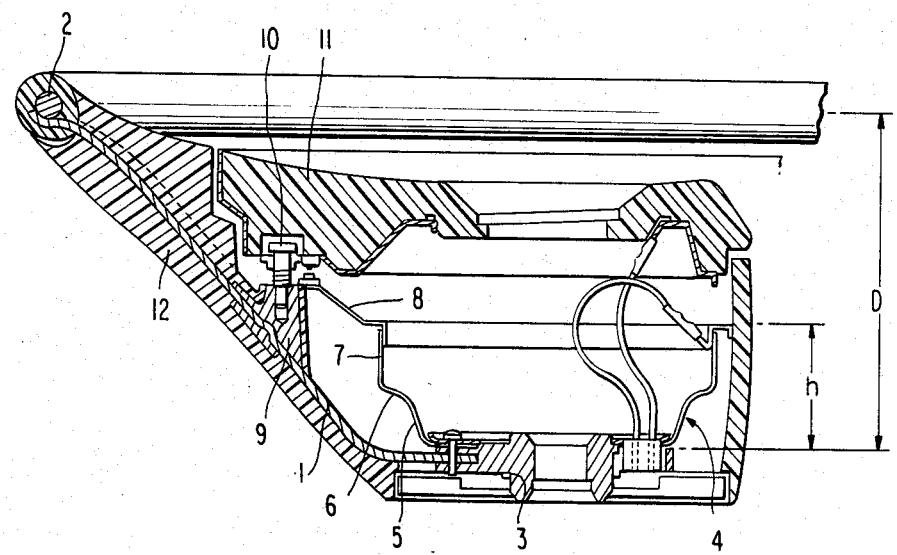
FIG. 2 is a cross sectional view taken along the line II—II in FIG. 1; wherein a deformable member is in undeformed configuration

Referring now to the drawings wherein like reference numerals are used throughout the several views to designate like parts and, more particularly, to FIGS. 1 and 2, according to these figures, a steering wheel includes four spokes 1 that extend from a rim 2 of the steering wheel, each spoke 1 having an upper portion embedded within a member 12, the member 12 being attached to the steering wheel rim 2, each spoke 1 being restrained against deformation, the spokes 1 emerging from member 12 at a lower portion of the spoke to connect to a hub 3 which is disposed substantially lower than the rim 2. The spokes 1 are fastened to the hub 3 and a deformation member generally designated by the reference numberal 4 is fastened to the hub 3. The deformation member 4 is constructed as an "impact cup" and includes a lower conical zone 5, an upper cylinderical zone 7, and a stepped portion 6 forming a transition between the conical zone 5 and cylindrical zone 7.

The deformation member 4 is connected with the respective spokes 1 by way of a bridge 8. The bridge 8 is fixed on the one hand to an upper edge of the deformation member 4 and, on the other hand, to a bracket 9 connected with the spokes 1. The connection between the bracket 9 and the buffer plate 11 is effected, in the illustrated embodiment, by means of a suitable fastener such as a bolt 10. The deformation member 4 is open in an upward direction and a buffer plate 11 is provided for covering the opening of the deformation member 4. Advantageously, the buffer plate 11 may also serve for an actuation of a horn of the motor vehicle. Shimmy of the steering wheel is realiably prevented by the connection of the deformation member 4 with the spokes 1 even if the spokes are constructed so as to be relatively yielding. Additionally, the spokes 1, formed of a metallic material are shaped in such a manner by a means well known to those skilled in the art that, in a lower region of the respective spokes 1, in a vicinity of attachment to the hub 3, the spokes bend more readily than in an upper region of the spokes in a vicinity of attachment to the rim 2 of the steering wheel.

As shown in FIG. 2, the deformation members 4 has a height h which is less than a distance D between the hub 3 and a plane represented by the line P extending through the rim 2 of the steering wheel. Additionally, the brackets 9 that serve for fastening or connecting at the bridge 8 the deformation member 4 with the respective spokes 1 are arranged at a position which is about one half of a height or length of the respective spokes 1.

Figure 3:
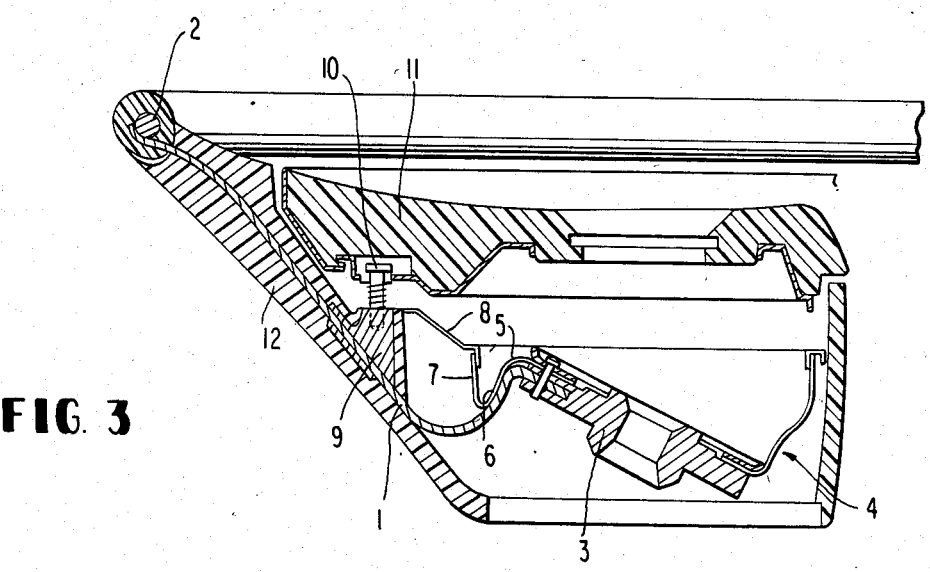
FIG. 3 is a cross sectional view taken along the lines II—II of FIG. 1 with the deformable member in a deformed condition.

FIG. 3 provides an illustration of the positioning of the elements of the safety wheel of the present invention upon the application of a predetermined impact force thereon. Upon the occurrence of an accident or the like, the impact force caused by the driver impacting upon the steering wheel results in the spokes 1 and deformation member 4 assuming the position illustrated in FIG. 3, with both the deformation member 4 and spokes 1 absorbing the energy of impact through deformation work.

While we have shown and described only one embodiment in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A steering wheel for motor vehicles, the steering wheel including a steering wheel rim, a hub means disposed at a position below a plane extending through the steering wheel rim, a plurality of spokes connecting the steering wheel rim to the hub means, and comprising a deformation means for absorbing energy of an impact upon the steering wheel, the deformation means includes a deformation member having a height which is less than a distance between the hub means and the steering wheel rim, means are provided for connecting a lower end of the deformation member to the hub means, bracket means mounted at one end thereof only to said spokes, said bracket means rigidly connected at a second end thereof via connecting means to an upper area only of the deformation member, each spoke comprising an upper means, restrained against deformation, for connecting to the steering wheel rim and lower means deforming more readily than the upper means of the spoke for connecting the spoke to the hub means.

2. A steering wheel according to claim 1, characterized in that the spokes are formed of a metallic material.

3. A steering wheel according to claim 1, characterized in that the deformation member is a plastically deformable cupshaped member opening in a direction of the steering wheel rim, and in that a buffer plate means is provided for covering the opening of the deformation member.

4. A steering wheel according to claim 3, characterized in that the buffer plate means is adapted to actuate a horn of the motor vehicle.

5. A steering wheel according to claim 3, characterized in that the deformation member includes an abrupt change in diameter forming a stepped transition area.

6. A steering wheel according to claim 5, characterized in that the deformation member has a cylindrical portion above the stepped transition area and a conical cross section below the stepped transition area.

7. A steering wheel according to claim 6, further characterized in that the connecting means comprise a bridge means for connecting the respective bracket means to the deformation member.

8. A steering wheel according to claim 7, characterized in that the bracket means are disposed on the respective spoke at a position of about one half of a height of the respective spoke.

9. A steering wheel according to claim 8, characterized in that bolt means are provided for attaching the bracket means to the buffer plate means.

10. A steering wheel according to claim 1, characterized in that the deformation member includes an abrupt change in diameter forming a stepped transition area.

11. A steering wheel according to claim 10, characterized in that the deformation member has a cylindrical portion above the stepped transition area and a conical cross section below the stepped transition area.

12. A steering wheel according to claim 1, characterized in that the connecting means comprise a bridge means for connecting the respective bracket means to the deformation member.

13. A steering wheel according to claim 12, characterized in that the bracket means are disposed on the respective spokes at a position of about one half of a height of the respective spokes.

* * * * *